United States Patent
De Leon et al.

(10) Patent No.: US 9,865,253 B1
(45) Date of Patent: Jan. 9, 2018

(54) SYNTHETIC SPEECH DISCRIMINATION SYSTEMS AND METHODS

(71) Applicant: VoiceCipher, Inc., Las Cruces, NM (US)

(72) Inventors: Phillip L. De Leon, Las Cruces, NM (US); Steven Spence, Las Cruces, NM (US); Bryan Stewart, Ventura, CA (US); Junichi Yamagishi, Tokyo (JP)

(73) Assignee: VoiceCipher, Inc., Las Cruces, NM (US)

( * ) Notice: Subject to any disclaimer, the term of this patent is extended or adjusted under 35 U.S.C. 154(b) by 84 days.

(21) Appl. No.: 14/465,595

(22) Filed: Aug. 21, 2014

Related U.S. Application Data (60) Provisional application No. 61/873,121, filed on Sep. 3, 2013.

(51) Int. Cl.
*G10L 15/08* (2006.01)
*G10L 25/90* (2013.01)

(52) U.S. Cl.
CPC ............ *G10L 15/083* (2013.01); *G10L 25/90* (2013.01)

(58) Field of Classification Search
USPC ........................................................ 704/246
See application file for complete search history.

(56) References Cited

U.S. PATENT DOCUMENTS

| | | | | |
|---|---|---|---|---|
| 2008/0154585 A1* | 6/2008 | Yoshioka | ............... | G10L 25/87 704/213 |
| 2009/0063146 A1* | 3/2009 | Yoshioka | ............... | G10L 17/26 704/250 |
| 2009/0319271 A1* | 12/2009 | Gross | ..................... | G10L 17/26 704/246 |
| 2010/0161327 A1* | 6/2010 | Chandra | ................ | G10L 13/06 704/235 |
| 2012/0004907 A1* | 1/2012 | Kulakcherla | ....... | G10L 21/0208 704/207 |
| 2012/0243707 A1* | 9/2012 | Bradley | .................. | G10L 19/00 381/98 |

* cited by examiner

*Primary Examiner* — Marivelisse Santiago Cordero
*Assistant Examiner* — Keara Harris
(74) *Attorney, Agent, or Firm* — Lewis Roca Rothgerber Christie LLP (57) ABSTRACT

The present invention is a system and method for discriminating between human and synthetic speech. The method and system include memory for storing a speaker verification application, a communication network that receives from a client device a speech signal having one or more discriminating features, and a processor for executing instructions stored in memory. The execution of the instructions by the processor extracts the one or more discriminating features from the speech signal and classifies the speech signal as human or synthetic based on the extracted features.

15 Claims, 9 Drawing Sheets

|  | Training | Testing |
|---|---|---|
| Human | NIST2002 | Switchboard |
| Synthetic | Blizzard 2008/2011, Festival pre-built voices | WSJ, RM |

|  | Training (Num. of Spkrs.) | Testing (Num. of Spkrs.) |
|---|---|---|
| Human | TIMIT (315) Switchboard (259) | TIMIT (111) Switchboard (110) |
| Synthetic | WSJ (141) RM (78) | WSJ (142) RM (79) |

SYNTHETIC SPEECH DISCRIMINATION SYSTEMS AND METHODS

CROSS-REFERENCE TO RELATED APPLICATIONS

This application claims the priority benefit of U.S. provisional application No. 61/873,121, entitled "Synthetic Speech Discrimination Systems and Methods," filed on Sep. 3, 2013, the disclosure of which is incorporated herein by reference.

BACKGROUND

Field of the Invention

Embodiments of the present invention generally relate to systems and methods for discriminating between human and synthetic speech and more specifically discriminating between human and synthetic speech using features derived from pitch patterns.

Description of the Related Art

Significant differences in pitch patterns between human and synthetic speech can be leveraged to classify speech as being human or synthetic in origin.

Speaker verification systems have been shown to be vulnerable to imposture using speech synthesizers. Thus synthetic speech can be used to spoof a speaker verification system and a countermeasure for synthetic speech is required to prevent this type of attack. The relative phase shift (RPS) feature of voiced speech has previously been used to discriminate between human and synthetic speech for a speaker verification application. In the previous work, the Linguistic Data Consortium (LDC) Wall Street Journal (WSJ) corpus consisting of 283 speakers was used for human speech, and synthetic voices were constructed for each WSJ speaker. RPS feature vectors extracted from both human and synthetic speech were then used to train a Gaussian Mixture Model (GMM) and classification as human or synthetic speech was based on a maximum likelihood (ML) decision. The results using the WSJ corpus were about 88% of the synthetic speech was classified correctly and about 4.2% of the human speech was classified incorrectly. In order to train the classifier, development of a synthetic voice matched to each speaker enrolled in the speaker verification system is required which is not practical.

Speaker verification systems have also been shown to be vulnerable to voice-converted speech where a source speech signal is modified to sound as if originating from a target voice. Thus voice-converted speech can be used to spoof a speaker verification system and a countermeasure for voice-converted speech is also required to prevent this type of attack. The modified group delay function (MGDF), based on the group delay of a smoothed power spectrum and additional phase information, has previously been used to discriminate between human and voice-converted speech for a speaker verification application. However, it is anticipated that the MGDF-based classifier is sensitive to the vocoder used: the same vocoder used by the spoofer must be used to train the system which is not a general solution. Also, it has been shown that at the current time, voice-converted speech is not high-enough in quality and naturalness when compared to synthetic speech and hence the risk posed by voice-converted speech may be lower than that for synthetic speech.

There is thus a need for a more reliable and accurate method for detecting synthetic speech and correctly classifying a speech signal as human in origin or synthetic.

SUMMARY OF THE CLAIMED INVENTION

One embodiment of the present invention is a method for discriminating between human and synthetic speech. The method includes storing a synthetic speech detection application in memory of a server, receiving, by a server from a client device, a speech signal having one or more discriminating features, extracting the one or more discriminating features from the speech signal presented to the synthetic speech detection application and classifying the speech signal as human or synthetic in origin based on the extracted features. The one or more discriminating features can be mean pitch stability, mean pitch stability range and jitter. A signal acquisition step can include prompting a user to speak a predetermined utterance, the predetermined utterance having one or more words that are discriminatory in classifying speech as synthetic or human. The extracting step can include segmenting the speech signal into an utterance, one or more words, or one or more phonemes, computing one or more pitch patterns of the speech signal at the utterance-, word-, or phoneme-level, segmenting the pitch pattern to form a binary image, and calculating one or more discriminating features from the image analysis of the pitch patterns to form a set of feature vectors. The classifying step can include storing a table of unique words and corresponding distance measures for human word models and synthetic word models in memory, measuring a weighted distance between a human word utterance and a corresponding synthetic word utterance, and classifying the speech as synthetic or human based on the measured distance as compared to the distance measures stored in the table. The weighted distance can be a Bhattacharyya distance. The classifying step may optionally include computing an interquartile range (IQR) of the feature vectors and comparing the IQR to a table of IQR values of pitch pattern features for synthetic speech and pitch pattern features for human speech stored in memory and classifying the speech as synthetic or human based on a comparison of the computed IQR to the table of IQR values. In this embodiment, synthetic speech may or may not be required for training the classifier. The method can also include authenticating a user of the client device based on verification of their identity from their voice and classification of the speech signal as human.

Another embodiment of the present invention is a system for discriminating between human and synthetic speech. The system includes memory for storing a synthetic speech detector application; a communication network that receives from a client device a speech signal having one or more discriminating features, and a processor for executing instructions stored in memory. The execution of the instructions by the processor extracts the one or more discriminating features from the speech signal and classifies the speech signal as human or synthetic based on the extracted features. The execution of the instructions by the processor can additionally include authenticating a user of the client device based on the classification of the speech signal. The one or more discriminating features can be mean pitch stability, mean pitch stability range and jitter.

Another embodiment of the present invention includes a non-transitory computer-readable storage medium, having embodied thereon a program executable by a processor to perform a method for discriminating between human and synthetic speech.

BRIEF DESCRIPTION OF THE DRAWINGS

The drawings, which are incorporated herein, illustrate one or more embodiments of the present invention, thus helping to better explain one or more aspects of the one or more embodiments. As such, the drawings are not to be construed as limiting any particular aspect of any embodiment of the invention. In the drawings.

DETAILED DESCRIPTION

State-of-the-art text-to-speech (TTS) systems are capable of synthesizing high-quality, natural sounding speech using small amounts of non-ideal speech data from a targeted person. These systems can therefore be used to "attack" or "spoof" a speaker recognition (SR) or speaker verification (SV) system and therefore pose a security risk. In particular, system access through voice authentication may be vulnerable through attacks using speech synthesizers. Embodiments of the present invention may be used as a countermeasure to prevent spoofing in an authentication system which uses a person's voice, i.e. a speaker verification system. One embodiment of the present invention includes a method and system for discriminating between human and synthetic speech using features based on pitch patterns. Mean pitch stability, mean pitch stability range, and jitter are features extracted after image analysis of pitch patterns. These features can be extracted at the utterance level, word level, or phoneme level depending on the classifier being used and application. For synthetic speech, these features lie in a small and distinct space as compared to human speech because of the inherent variability in human speech. Therefore these features, with the appropriate classifier, can be used to classify speech as human or synthetic thus detecting the presence of synthetic speech and serving as a countermeasure.

A pitch pattern is calculated as a normalized, short-range, auto-correlation of a speech signal over an approximately 2-20 ms range. Embodiments of the present invention include a system that accurately classifies whether speech is human or synthetic. One embodiment of the invention, leverages speech used to enroll a (human) speaker into the SV system to train a classifier. In another embodiment, any available synthetic speech, without regard to whether it is matched to a corresponding human speaker, is used to train the classifier. In other words, the system can detect synthetic speech without a corresponding human speaker for the classifier. Thus, the system aims to build a general synthetic speech detection model without restrictions on training data other than a reasonably large number of human speech signal examples or a reasonably large number of synthetic speech signal examples.

The pitch pattern, $\varphi(t, \tau)$ of an embodiment of the present invention is calculated by dividing the short-range autocorrelation function, $r(t, \tau)$ by a normalization function, $p(t, \tau)$ $$\phi(t, \tau) = \frac{r(t, \tau)}{p(t, \tau)} \tag{1}$$

The short range auto-correlation function is given by $$r(t,\tau)=\int_{-\tau/2}^{\tau/2} x(t+\xi-\tau/2)x(t+\xi+\tau/2)d\xi \tag{2}$$

and is similar to the short-time autocorrelation function for multiple lag inputs. The normalization function (equation 3 below) is proportional to the frame energy.

$$p(t, \tau) = \frac{1}{2}\int_{-\tau/2}^{\tau/2} x^2(t+\xi-\tau/2)d\xi + \frac{1}{2}\int_{-\tau/2}^{\tau/2} x^2(t+\xi+\tau/2)d\xi \tag{3}$$

Figure 1A:
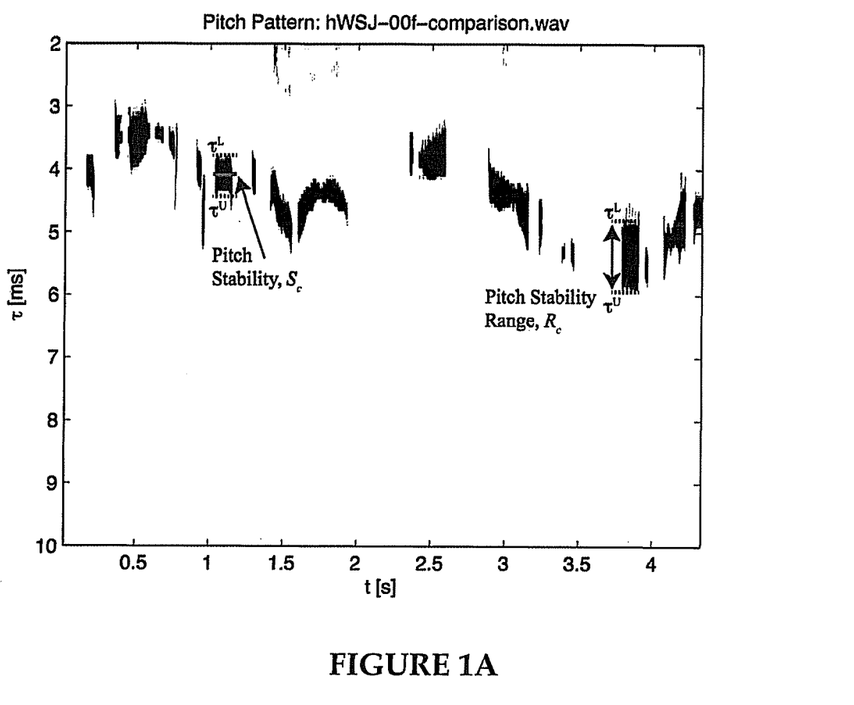
FIG. 1A illustrates a segmented binary pitch pattern image from a human speech signal.
Figure 1B:
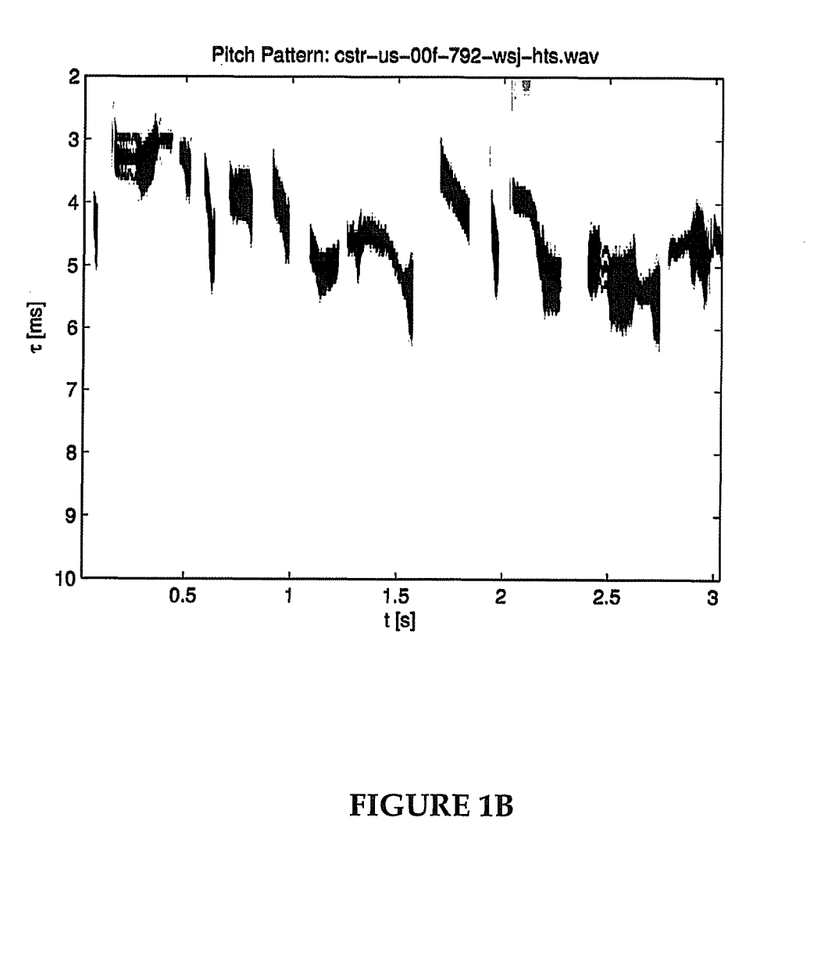
FIG. 1B illustrates a segmented binary pitch pattern image from a synthetic speech signal.

Once the pitch pattern is computed, it is segmented into a binary pitch pattern image through the rule $$\phi_{seg}(t, \tau) = \begin{cases} 1, & \phi(t, \tau) \geq \theta_t \\ 0, & \phi(t, \tau) < \theta_t \end{cases} \tag{4}$$

where $\theta_t$ is a threshold set to half the pitch pattern peak value at time t. An example pitch pattern image is shown in FIGS. 1A and 1B. FIG. 1A is a segmented binary pitch pattern image from a human speech signal. FIG. 1B is a segmented binary pitch pattern image from a synthetic speech signal. In both plots, the spoken phrase was "The female produces a litter of two to four young in November." Pitch stability $S_c$, pitch stability range $R_c$, upper edge $\tau^U$, and lower edge $\tau^L$ are denoted in FIG. 1A. The pitch pattern $\varphi(t, \tau)$ is computed for $2 \leq \tau \leq 20$ ms and the threshold set as $\theta_t = 1/$square root of 2 for all t.

Figure 2:
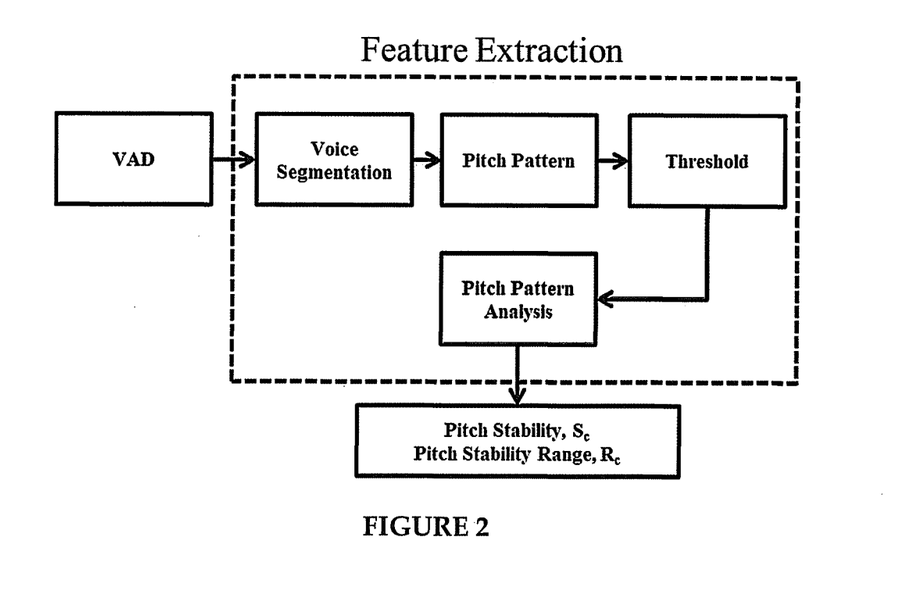
FIG. 2 is a feature extraction diagram.

Extracting useful features from a pitch pattern is a multi-step process illustrated in FIG. 2 and includes 1) signal segmentation, 2) computation of the pitch pattern, and 3) image analysis. The features can be extracted from the utterance as a whole or extracted at the word-level or extracted at the phoneme-level. If extracted at the word- or phoneme-level, an automatic speech recognizer can be used to segment the utterance into individual words or individual phonemes prior to calculating the pitch pattern. In order to calculate the pitch pattern, the speech signal is first segmented along utterance, word or phoneme boundaries. In the second step, the pitch pattern is computed using equation (1) and the binary pitch pattern is computed using equation (4).

In the third step, image analysis of the segmented binary pitch pattern is performed in order to extract the connected components, i.e. black regions in FIGS. 1A and 1B. This processing includes determining a bounding box and area of a connected component which are then used to filter out very small and irregularly-shaped components. The small and irregularly-shaped connected components are artifacts of the speech signal and not useful in feature extraction. The resulting connected components are then analyzed and used to compute the following statistics-based features (defined below): mean pitch stability, $\mu_S$; mean time stability bandwidth, $\mu_B$; and jitter, J. The image processing-based approach of an embodiment of the present invention determines parameters on a per-connected component basis and then computes statistics over the connected components.

Mean Pitch Stability

The pitch stability of connected component, c is the average value of $\tau$ over the connected component $$S_c = \frac{1}{T} \int_c \left[ \frac{\tau^U(t) + \tau^L(t)}{2} \right] dt \qquad (5)$$

where T is the time-support of c and where U and L denote the upper and lower edges of z, respectively, see FIG. 1A. The mean pitch stability is calculated as $$\mu_S = \frac{1}{C} \sum_{c=1}^{C} S_c \qquad (6)$$

where C is the number of connected components in the speech signal.

Mean Pitch Stability Range

The pitch stability range of connected component, c is the average range of $\tau$ over the connected component $$R_c = \frac{1}{T} \int_c [\tau^U(t) - \tau^L(t)] dt \qquad (7)$$

see FIG. 1(A). The mean pitch stability range is calculated as $$\mu_R = \frac{1}{C} \sum_{c=1}^{C} R_c \qquad (8)$$

Jitter

The pitch pattern jitter, J is computed as follows. The peak lag for connected component, c at time t is calculated as $$\phi'_c(t) = \max_\tau \phi(t, \tau) \qquad (9)$$

and the variance of the peak lags for connected component, c is calculated as $$\sigma_c^2 = \text{var}[\phi'_c(t)] \qquad (10)$$

The pitch pattern jitter, J is then the average of the peak lag variances of the connected components $$J = \frac{1}{C} \sum_{c=1}^{C} \sigma_c^2 \qquad (11)$$

In summary, the segmented binary pitch pattern is first computed with equation (4); image analysis is performed as described in the second step; and mean pitch stability equation (6), mean pitch stability range equation (8), and jitter equation (11) are computed and used to form the feature vector in the third step, $$x = [\mu_S, \mu_R, J]. \qquad (12)$$

The feature vector conveniently encapsulates the discriminating data of the signal and allows classification of the speech signal as either human or synthetic.

Based on informal listening tests, state-of-the-art synthetic speech is often hyper-articulated which usually correlates to a larger time stability bandwidth. In addition, because it is difficult to precisely model human physiological features required to properly synthesize natural speech, synthetic speech also has a different mean pitch stability than human speech. Finally, co-articulation, the transition from one phoneme to the next, of synthetic speech occurs more rapidly than in human speech where co-articulation is smooth and relaxed. This difference is captured by the jitter of the pitch pattern. When the pitch pattern is extracted at the phoneme-level, the pitch pattern jitter, J is not required in the feature vector in equation (12).

Figure 3:
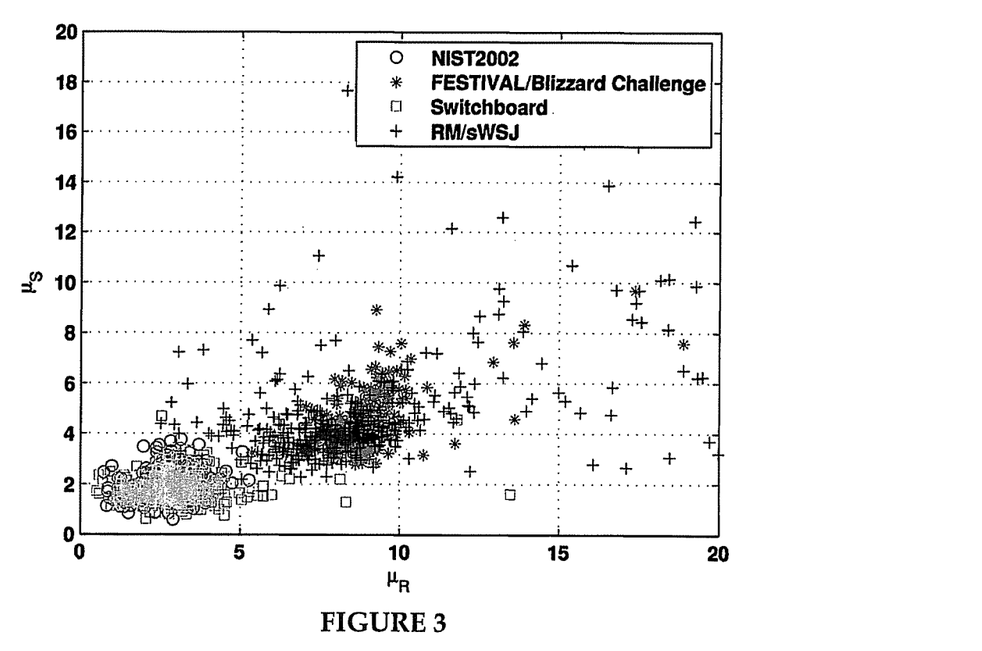
FIG. 3 is a scatter plot of the mean pitch stability and mean pitch stability range features from speech used in training and evaluation.

FIG. 3 shows an example scatter plot of the mean pitch stability, $\mu_s$ and mean pitch stability range, $\mu_R$ from speakers in corpora used in the training and evaluation. For human speech (circles and squares), these features lie in a compact and distinct space as compared to synthetic speech (asterisks and pluses).

Figure 5:
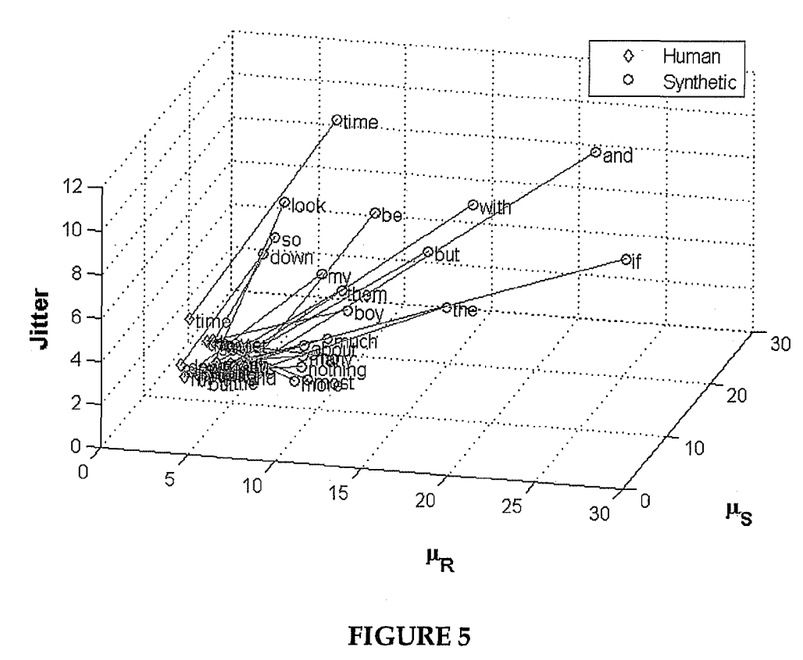
FIG. 5 is a scatter plot of the mean pitch stability, mean pitch stability range, and jitter of 20 word models with the largest separation as calculated by Bhattacharyya distance measure.

Vocal tract features, such as those based on mel-frequency cepstral coefficients (MFCCs), are typically segmental and based on short-time frames. MFCCs are insufficient in discriminating between synthetic and natural speech. On the other hand, connected components extracted from the binary pitch pattern image are supra-segmental features extracted across many frames. The co-articulation, or supra-segmental characteristics of a pitch pattern for synthetic speech, differs from that of human speech and to a greater extent in certain words. To illustrate this point, FIG. 5, shows a scatter plot of feature vectors for the top 20 human and synthetic word models with the largest separation as calculated by the Bhattacharyya distance measure. It is evident that for human speech, these features lie in a compact and distinct space as compared to synthetic speech feature. Use of these words in a text-prompted authentication based on voice can be used to improve the accuracy of a classifier.

Maximum Likelihood Classifier

An embodiment of the present invention includes a maximum likelihood (ML) classifier based on the log-likelihoods computed from a weighted mean feature vector extracted at the word-level and the statistical models developed during classifier training. A method of an embodiment of the present invention models the distribution of feature vectors extracted from word-level pitch patterns of human and synthetic speech, as multivariate Gaussian distributions with diagonal covariance matrices, $N^{hum}$ ($\mu_{hum}$, $\Sigma_{hum}$) and $N^{syn}$ ($\mu_{syn}$, $\Sigma_{syn}$), respectively. Also, each unique word's feature vectors (collected from all human or all synthetic training speech), are individually modeled using Gaussian distributions, $N_n^{hum}(\mu_n, \Sigma_n)$ and $N_n^{syn}(\mu_n, \Sigma_n)$ where n denotes the word index. A distance measure (described below) is also computed between the human and synthetic word models. The unique words and distance measures are then stored in a lookup table indexed by n.

In the test stage, $x_n$ is the feature vector extracted from the nth corresponding word and the weighted mean feature vector is given by $$x = \sum_{n=1}^{N} D_n x_n \quad (13)$$

where D n is a distance measure between $N_n^{hum}$ and $N_n^{syn}$ and N is the number of words in the test utterance. The log-likelihood ratio is then given by $$\Lambda = \log p(x|N^{hum}) - \log p(x|N^{syn}) \quad (14)$$

and the utterance is determined to be human if $$\Lambda \geq \theta \quad (15)$$

where θ is the decision threshold.

There are many distance measures that may be used to calculated Dr, in equation (13). However, the Bhattacharyya distance measure is preferred. The Bhattacharyya distance between Gaussian pdfs, $N_i(\mu_i, \Sigma_i)$ and $N_j(\mu_j, \Sigma_j)$ is given by $$D_B(N_i \| N_j) = \frac{1}{8}(\mu_j - \mu_i)^T \left[\frac{\sum_i + \sum_j}{2}\right]^{-1}(\mu_j - \mu_i) + \frac{1}{2}\ln\left(\frac{|(\sum_i + \sum_j)/2|}{\sqrt{|\Sigma_i||\Sigma_j|}}\right) \quad (16)$$

where |●| denotes matrix determinant. The first term on the right side of the equality, measures separation due to the Gaussian pdfs' mean vectors, $\mu_i$ and $\mu_j$, while the second term measures separation due to the Gaussian pdfs' covariance matrices, $\Sigma_i$ and $\Sigma_j$.

The distance between each human word model and corresponding synthetic word model is calculated during training. During testing $D_n$ is normalized so that $$\sum_{n=1}^{N} D_n(N_n^{hum} \| N_n^{syn}) = 1. \quad (17)$$

The weights used in the classifier emphasize the feature vectors of the word models that exhibit greater separability between human and synthetic speech. Conversely, the weights de-emphasize the feature vectors of word models that are similar. The use of words with high weights, i.e. words with higher discriminating ability, can be used in a text-prompted authentication system based on voice or SV system to improve the accuracy at classifying speech as human or synthetic. The pitch-pattern based threshold classifier using the WSJ speech corpus (283 speakers) and synthetic speech matched to the WSJ speech corpus was evaluated. For human speech, the classifier has an accuracy rate of 98.0% and for synthetic speech the classifier has an accuracy rate of 98.0%.

Threshold Classifier

Another embodiment of the present invention includes a threshold classifier which uses pitch pattern feature vectors extracted at the phoneme-level to detect synthetic speech. The threshold classifier is based on the interquartile ranges (IQRs) or statistical dispersions of mean pitch stability, s and mean pitch stability range, $_R$. Synthetic speaker models average the acoustic and fundamental frequency characteristics of a speaker's voice, whereas human speech remains variable. At the phoneme level, this results in smaller IQR values of the pitch pattern features for synthetic speech when compared to the IQR values of human pitch pattern features. This difference can be used to detect synthetic speech.

Figure 8:
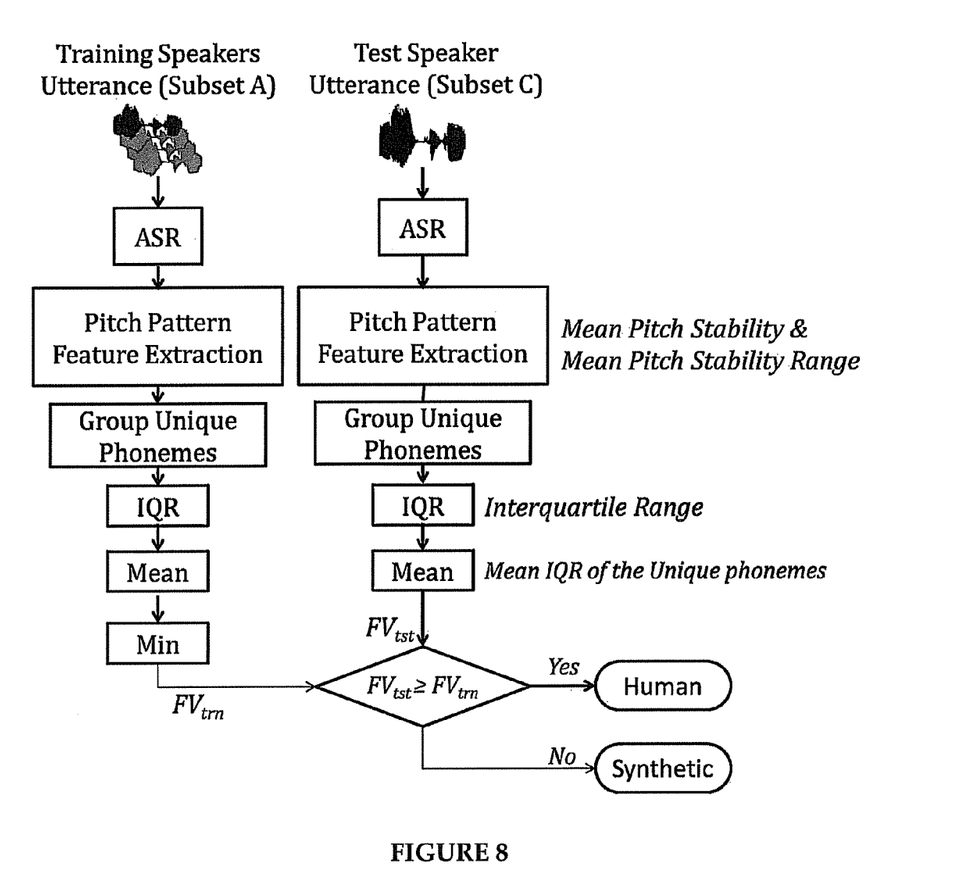
FIG. 8 illustrates a threshold classifier for human versus synthetic speech based on IQRs of pitch pattern statistics.

During the training stage of the classifier, each speaker's enrollment speech used in the speaker verification system is segmented along phoneme boundaries using an automatic speech recognition (ASR) system. The pitch pattern feature vector is computed for each phoneme of the utterance as described above and for each unique phoneme, the IQRs of the associated phoneme features are computed. Finally, the mean of the IQRs for each enrolled speaker is computed and the minimum means are stored. When the countermeasure is invoked, the means of the IQRs for the test speaker are computed as in the training stage and compared to the minimums from the training. If the test speaker's mean IQRs are greater than the training minimums, the test speaker is declared human otherwise, synthetic. Note that with this classifier, no synthetic speech is required for training. FIG. 8 illustrates the threshold classifier based on IQR of pitch pattern statistics.

The pitch-pattern based threshold classifier using the VoiceBank speech corpus (200 speakers) and synthetic speech matched to the VoiceBank speech corpus was evaluated. For human speech, the classifier has an accuracy rate of 96.5% and for synthetic speech the classifier has an accuracy rate of 96.0%.

Authentication System

Figure 7:
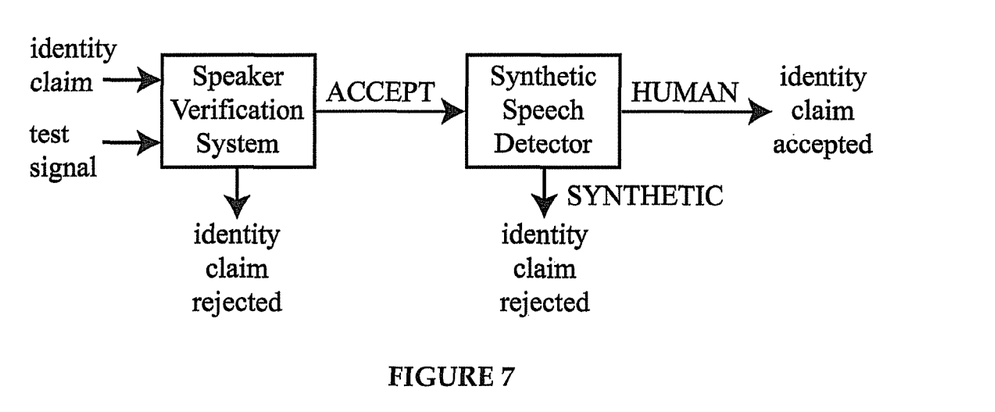
FIG. 7 illustrates an overall system of a speaker verification system and a synthetic speech detector used to classify speech as human or synthetic after initially verifying an identity claim.

Another embodiment of the present invention is illustrated in FIG. 7 and includes an authentication system based on voice or SV system where a user provides a claim of identity and is prompted to speak a certain utterance that is chosen by a designer. The synthetic speech detection system or countermeasure is invoked after the SV system initially accepts the claim of identity. If the synthetic speech detection system classifies the test signal as human speech, the identity claim is accepted otherwise the test signal is classified as synthetic and the identity claim is rejected. The use of the countermeasure reduces the risk of spoofing the SV system using synthetic speech.

A SV system preferably accepts or rejects a claimed identity based on a voice sample from the speaker. SV systems have been shown to be vulnerable to artificial speech signals such as synthetic speech or voice-converted speech by accepting an identity claim based on artificial speech signal.

Analyzing common words in a standard corpora can serve as a basis for improved discrimination. An embodiment of the present invention is an authentication system based on a text-prompted SV system where a user is prompted to speak a certain utterance which is preferably chosen by a designer. In this embodiment, the utterance preferably includes many of these discriminating words thus improving the accuracy of synthetic speech detection. An embodiment of the present invention includes a system and method that 1) leverages sub-utterance information i.e. word or phoneme segments of the claimant's utterance, 2) statistically models each word's features using a multivariate Gaussian distribution, and 3) utilizes a maximum likelihood (ML) with a weighted mean feature vector based on the Bhattacharyya distance measure or threshold classifier.

EXAMPLES

The following are non-limiting examples.

Example 1

In this example, embodiments of the present invention were used to compare the use of a speaker's time stability and pitch pattern peak, lower half, upper half, and half bandwidth as features to discriminate between human and synthetic speech. The system used 100 samples of human speech from a male subject and generated the synthetic speech. Decision thresholds based on time stability and pitch pattern measures were obtained from 20 human and 20 synthetic speech samples out of the 100. This process was performed on a total of five individuals with the "half bandwidth" providing the best average performance of correct rejection of synthetic speech, ranging from about 93.3% to about 100%.

Synthetic speech material from a variety of sources was collected as well as directly synthesized speech. The Festival Speech Synthesis System v2.1 was used to synthesize speech from 15 speaker models included in the system which are based on a diphone synthesizer. Blizzard Challenge voices (total of 226), from the 2008 and 2011 competitions, were obtained. The WSJ corpus was used to construct 283 different speaker models using a speaker-adaptive, HIVIM-based speech synthesis system, H Triple S (HTS). These WSJ HTS speaker models were used in Festival to generate the synthetic WSJ speech. Resource Management (RM) voices were obtained from the "Voices of the World" (VoW) demonstration system hosted at The Centre for Speech Technology Research. RM speaker models were generated using a speaker-adaptive HTS similar to the WSJ speaker models.

For the synthetic speech used in training the classifier, the pre-built Festival voice models were used to synthesize the ten standard, phonetically-balanced TIMIT sentences beginning with, "She had your dark suit in greasy wash water all year . . . ". This resulted in 15 synthetic speech signals that are 15-30s in duration. The Blizzard Challenge synthetic speech utterances were limited to the first 30s of speech and resulted in 152 and 59 speech signals from the 2008 and 2011, respectively competitions. For the human speech used in training the classifier, we used the NI5T2002 corpus (total of 330 speakers) with each signal approximately 30s in length.

Figure 4:
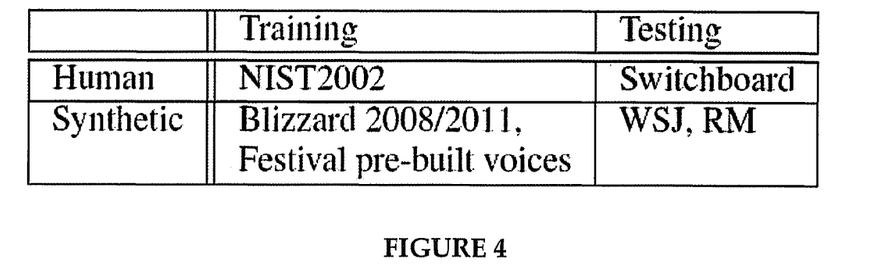
FIG. 4 is a table of speech corpora used for training and testing a classifier.

The classifier was evaluated using human speech from the Switchboard corpus (352 speakers) and synthetic speech (518 synthesized voices) from the synthetic WSJ voices and the synthetic RM voices, as noted above. The synthetic WSJ voices were generated using the TIMIT sentences and the synthetic RM voices uttering, "Finally a little girl did come along and she was carrying a basket of food." Speech corpora usage is summarized in FIG. 4.

Feature vectors in equation (12) were extracted from human and synthetic training speech. The distribution of synthetic speech feature vectors is modeled as a multivariate Gaussian distribution with a diagonal covariance matrix. A decision threshold is then set by computing the likelihoods of the training feature vectors and adjusting for combined highest accuracy. Using the test speech, results show classification accuracy of 98% for human speech and 96% for synthetic speech. The results for classification of synthetic speech are better than those previously known but without the complication of requiring development of a synthetic voice matched to each human enrolled in the system.

The feature vector in equation (12) was extracted from the pitch pattern for voiced segments within an utterance. These vectors were then collectively modeled as a Gaussian distribution. The vectors were modeled at the phoneme-level where it was observed that there were large separation distances in the feature vectors for certain phonemes. Classifiers based at the phoneme-level can result in increased accuracy.

A system and method of this example uses mean pitch stability, mean pitch stability range, and jitter as features extracted from image analysis of pitch patterns for discrimination between human and synthetic speech. A classifier based on a Gaussian distribution of these features show about 98% accuracy in correctly classifying human speech and about 96% accuracy in correctly classifying synthetic speech.

Example 2

Figure 6:
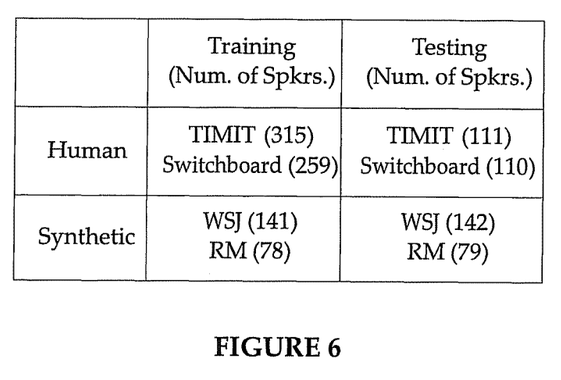
FIG. 6 is a table of speech corpora and number of speakers used for training and testing a weighted, ML classifier.

The human TIMIT corpus has 630 speakers, 296 phonetically-balanced sentences, and a total of 4893 unique words. Each WSJ voice model was used to synthesize all 296 phonetically-balanced TIMIT sentences resulting in 283 synthetic speakers each uttering 4893 unique words. The human Switchboard-1 corpus was separated into word segments according to the 500 word vocabulary. The synthetic RM corpus has 157 synthesized voices each uttering 106 unique words. In this example, there were 106 common unique words that were spoken by each speaker of the four corpora. Half of the human speakers and half of the synthetic speakers were used for training. The other half of the human and synthetic speakers were used for testing the classifier. Two-hundred twenty-two human speakers were chosen at random from the available corpora in order to match the number of synthetic speakers used in testing. There were no speakers in common between the training and testing datasets. Speakers are unique to either training or testing datasets. Speech corpora usage is summarized in FIG. 6.

The results presented in Example 1 above used a likelihood classifier and a different set of training and testing corpora than presented in this Example 2.

Certain words provide stronger discrimination between human and synthetic speech. However, modeling a large number of words may be impractical. A maximum likelihood classifier using a Bhattacharyya weighted mean feature vector based on the words in a speaker's utterance is preferred. The synthetic WSJ speech and synthetic RM voices were obtained, human speech from the TIMIT corpus, and human speech from the Switchboard-1 corpus. Results show about 98% accuracy in correctly classifying human speech and about 98% accuracy in correctly classifying synthetic speech. The classifier presented in Example 2 provided greater discrimination between human and synthetic speech compared to the classifier in Example 1.

Example 3

In this example, embodiments of the present invention were used to compare the use of a speaker's mean pitch stability and mean pitch stability range as features to discriminate between human and synthetic speech. In this embodiment, the threshold classifier was used to evaluate accuracy at detecting synthetic speech.

The VoiceBank (VB) speech corpus includes speech data from 500 native speakers of English with various accents. From this corpus we have chosen the native speakers of British English with various U.K. dialects for our experiments. Each speaker reads out a different set of about 400 sentences excerpted from newspapers as well as a common set of sentences from other sources.

In order to conduct the evaluation, synthetic speech was generated for each of the target speakers. The TTS system then developed a synthetic speaker model for each target speaker. The VB corpus was partitioned into three disjoint subsets: "A" used for SV enrollment and training countermeasures, "B" used to build the TTS models, and "C" used as test speech for SV and countermeasure evaluation. The files for each speaker in the VB corpus were allocated in a 25%-50%-25% proportion for the A, B, and C subsets. A synthetic speech corpus, parallel to subset C, was created for the evaluation. However, subset A was not used to create artificial speech for training countermeasures since this would have placed additional burdens on developers.

Using the SV system (without the synthetic speech detector), it was shown that out of 100 female and 100 male synthetic speakers, 23 female and 60 male voices were falsely accepted leading to an average 41.5% spoofing success.

Of the 200 true human claimants which the SV system accepted and passed onto the countermeasure, the pitch-pattern-based classifier correctly classified all of these as human and thus did not raise the false rejection rate (FRR) for true-claimant human speech. Of the 83 synthetic target speakers which the SV system accepts, the pitch-pattern-based classifier correctly classified all of these as non-human and thus lowers the FAR for synthetic speech from 41.5% to 0%.

Figure 9:
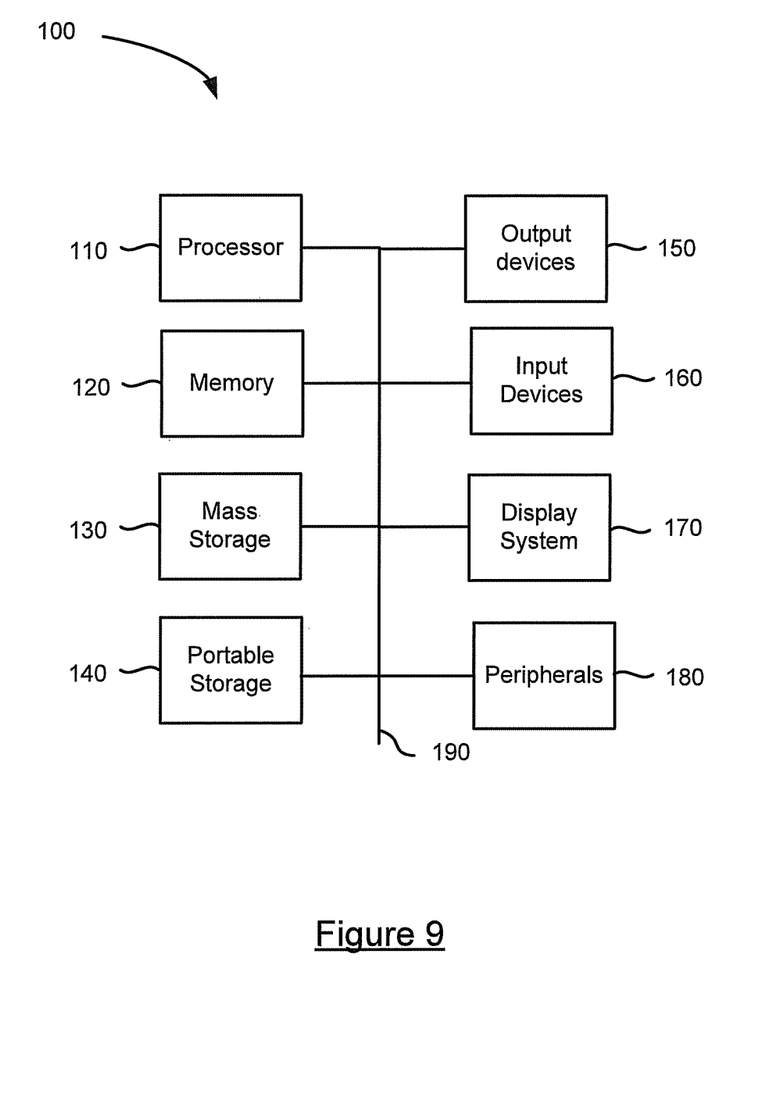
FIG. 9 illustrates a flow chart showing an exemplary computing system that may be used to implement a computing device for use with embodiments of the present invention.

FIG. 9 illustrates an exemplary computing system 100 that may be used to implement a computing device for use with the present technology. System 100 of FIG. 9 may be implemented in the contexts of the likes of a client, a network server, an application server, and/or a data store that may implement a system used to process signals and perform functions as described herein. The computing system 100 of FIG. 9 includes one or more processors 110 and memory 120. Main memory 120 stores, in part, instructions and data for execution by processor 110. Main memory 120 can store the executable code when in operation. The system 100 of FIG. 9 further includes a mass storage device 130, portable storage medium drive(s) 140, output devices 150, user input devices 160, a graphics display 170, and peripheral devices 180.

The components shown in FIG. 9 are depicted as being connected via a single bus 190. However, the components may be connected through one or more data transport means. For example, processor unit 110 and main memory 120 may be connected via a local microprocessor bus, and the mass storage device 130, peripheral device(s) 180, portable storage device 140, and display system 170 may be connected via one or more input/output (I/O) buses.

Mass storage device 130, which may be implemented with a magnetic disk drive, optical disk drive, or other solid state storage device, is a non-volatile storage device for storing data and instructions for use by processor unit 110. Mass storage device 130 can store the system software for implementing embodiments of the present invention for purposes of loading that software into main memory 120.

Portable storage device 140 operates in conjunction with a portable non-volatile storage medium, such as a floppy disk, compact disk or Digital video disc, to input and output data and code to and from the computer system 100 of FIG. 9. The system software for implementing embodiments of the present invention may be stored on such a portable medium and input to the computer system 100 via the portable storage device 140.

Input devices 160 provide a portion of a user interface. Input devices 160 may include an alpha-numeric keypad, such as a keyboard, for inputting alpha-numeric and other information, or a pointing device, such as a mouse, a trackball, stylus, or cursor direction keys. Input devices 160 may also include user data acquisition device such as a microphone, a camera, or other various devices that can acquire user biometric information. Additionally, the system 100 as shown in FIG. 9 includes output devices 150. Examples of suitable output devices include speakers, printers, network interfaces, and monitors.

Display system 170 may include a liquid crystal display (LCD) or other suitable display device. Display system 170 receives textual and graphical information, and processes the information for output to the display device.

Peripherals 180 may include any type of computer support device to add additional functionality to the computer system. For example, peripheral device(s) 180 may include a modem, a router, or network interface card.

The components contained in the computer system 100 of FIG. 9 are those typically found in computer systems that may be suitable for use with embodiments of the present invention and are intended to represent a broad category of such computer components that are well known in the art. Thus, the computer system 100 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, iOS, and other suitable operating systems.

Figure 10:
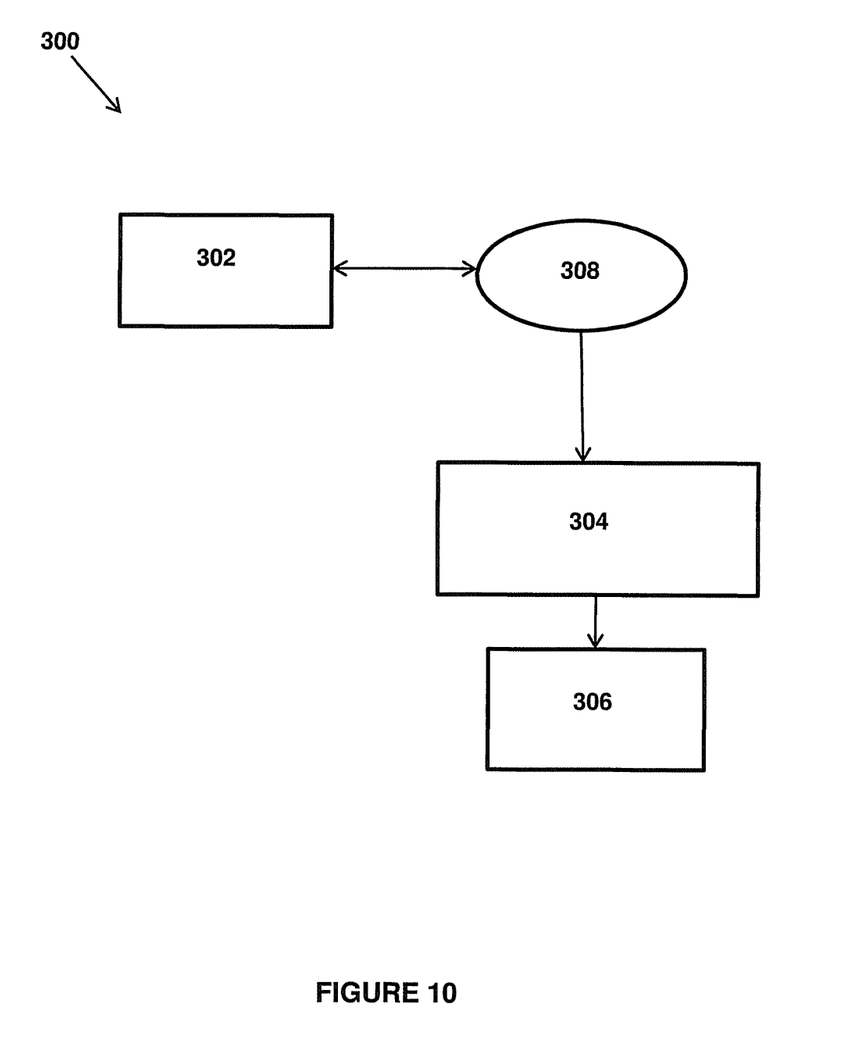
FIG. 10 illustrates a flow chart showing an exemplary client-server computing system.

FIG. 10 illustrates a block diagram of a client-server computing system 300 for providing remote access to application, speech signals, etc. Client-server computing system 300 includes server 302 that is operatively connected to client 304 and display 306 via communication network 308. Network 308 may be, for example, a local area network (LAN) and/or a wide area network (WAN) for connecting to the Internet. Entities of client-server computing system 300 may connect to network 308 by any wired and/or wireless means. While client 304 and display 306 are illustrated as separate physical components (e.g., illustrative of a common implementation of a desktop or a workstation computing system, such as clients running natively on Windows, Linux, UNIX and Mac OS X operating system), the capabilities of such components can also be integrated in a single device (e.g., a mobile phone or a tablet computer).

The present invention may be implemented in an application that may be operable using a variety of computing devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A computer-implemented method for reducing a security vulnerability of a speech-based user authentication process, the method comprising:
    storing executable instructions in memory of a server;
    receiving, by the server from a client device, a request to authenticate a user;
    receiving, by the server from the client device, a speech signal having one or more discriminating features; and
    executing, by a processor of the server, the instructions stored in memory of the server, wherein execution of the instructions causes the processor to:
    extract the one or more discriminating features from the received speech signal, wherein extracting the one or more discriminating features includes:
    segmenting the received speech signal into at least one of one or more utterances, one or more words, or one or more phonemes;
    computing one or more pitch patterns of the received speech signal; segmenting the pitch pattern to form a pitch pattern image, the pitch pattern image displaying a plurality of discrete data regions each forming a shape; and
    performing an image analysis of the pitch pattern image, wherein performing the image analysis includes:
    determining for each of at least a portion of the regions an upper line value associated with an upper edge of the shape displayed in the pitch pattern image and a lower line value associated a lower edge of the shape displayed in the pitch pattern image, and
    calculating one or more discriminating features based on the upper line value and the lower line value determined from the pitch pattern image to form a set of feature vectors;
    classify the received speech signal based on the extracted features as a synthetic speech signal configured to imitate a sequence of human vocal sounds, and
    decline the request to authenticate the user based on the classification of the received speech signal as the synthetic speech signal.

2. The computer-implemented method of claim 1, wherein the one or more discriminating features include a mean pitch stability value, a mean pitch stability range, and a jitter value.

3. The computer-implemented method of claim 1, wherein the classifying step includes:
    prompting a user to speak a predetermined utterance, the predetermined utterance having one or more words that are discriminatory in distinguishing a human speech signal comprising a sequence of human vocal sounds from a synthetic speech signal configured to imitate the sequence of human vocal sounds;
    storing a table of unique words and corresponding distance measures for human word models and synthetic word models in memory;
    measuring a weighted distance between a human word utterance and a corresponding synthetic word utterance; and
    classifying the received speech as synthetic rather than human based on the measured distance as compared to the distance measures stored in the table.

4. The computer-implemented method of claim 3, wherein the weighted distance is a Bhattacharyya distance.

5. The computer-implemented method of claim 3, wherein the classifying step includes:
    computing an interquartile range (IQR) of the feature vectors and comparing the IQR to a table of IQR values of pitch pattern features for synthetic speech and pitch pattern features for human speech stored in memory; and
    classifying the received speech as synthetic rather than human based on a comparison of the computed IQR to the table of IQR values.

6. The computer-implemented method of claim 1, wherein no synthetic speech is required to train a classifier.

7. A system for reducing a security vulnerability of a speech-based user authentication process, the system comprising:
    a memory configured to store executable instructions;
    a network interface communicatively coupled to the memory, the network interface configured to receive over a communication network from a client device: \
    a request to authenticate a user, and
    a speech signal having one or more discriminating features; and
    a processor configured to execute the instructions stored in the memory and thereby:
    extract the one or more discriminating features from the received speech signal, wherein extracting the one or more discriminating features includes:
    segmenting the received speech signal into at least one of one or more utterances, one or more words, or one or more phonemes,
    computing one or more pitch patterns of the received speech signal, segmenting the pitch pattern to form a pitch pattern image, the pitch pattern image displaying a plurality of discrete data regions each forming a shape, and
    performing an image analysis of the pitch pattern image, wherein performing the image analysis includes:
    determining for each of at least a portion of the regions an upper line value associated with an upper edge of the shape displayed in the pitch pattern image and a lower line value associated a lower edge of the shape displayed in the pitch pattern image, and calculating one or more discriminating features based on the upper line value and the lower line value determined from the pitch pattern image to form a set of feature vectors;

classify the received speech signal based on the extracted features as a synthetic speech signal configured to imitate a sequence of human vocal sounds, and decline the request to authenticate the user based on the classification of the received speech signal as the synthetic speech signal.

8. The system of claim 7, wherein the one or more discriminating features include a mean pitch stability value, a mean pitch stability range, and a jitter value.

9. The system of claim 7, wherein the classification comprises:

prompting a user to speak a predetermined utterance, the predetermined utterance having one or more words that are discriminatory in distinguishing a human speech signal comprising a sequence of human vocal sounds from a synthetic speech signal configured to imitate the sequence of human vocal sounds;

storing a table of unique words and corresponding distance measures for human word models and synthetic word models in memory;

measuring a weighted distance between a human word utterance and a corresponding synthetic word utterance; and classifying the received speech as synthetic rather than human based on the measured distance as compared to the distance measures stored in the table.

10. The system of claim 9, wherein the weighted distance is a Bhattacharyya distance.

11. The system of claim 7, wherein the classification comprises:

computing an interquartile range (IQR) of the feature vectors and comparing the IQR to a table of IQR values of pitch pattern features for synthetic speech and pitch pattern features for human speech stored in memory; and classifying the received speech as synthetic rather than human based on a comparison of the computed IQR to the table of IQR values.

12. The system of claim 7, wherein no synthetic speech is required to train a classifier.

13. A non-transitory computer-readable storage medium having embodied thereon a program executable by a processor to perform a method for reducing a security vulnerability of a speech-based user authentication process, the method comprising:

receiving, by a server from a client device, a speech signal having one or more discriminating features;

extracting the one or more discriminating features from the received speech signal wherein extracting the one or more discriminating features includes:

segmenting the received speech signal into at least one of one or more utterances, one or more words, or one or more phonemes, computing one or more pitch patterns of the received speech signal, segmenting the pitch pattern to form a pitch pattern image, the pitch pattern image displaying a plurality of discrete data regions each forming a shape, wherein performing the image analysis includes:

determining for each of at least a portion of the regions an upper line value associated with an upper edge of the shape displayed in the pitch pattern image and a lower line value associated a lower edge of the shape displayed in the pitch pattern image, and calculating one or more discriminating features based on the upper line value and lower line value determined from the pitch pattern image to form a set of feature vectors;

classifying the received speech signal based on the extracted features as a synthetic speech signal configured to imitate a sequence of human vocal sounds and declining the request to authenticate the user based on the classification of the received speech signal as the synthetic speech signal.

14. The non-transitory computer-readable storage medium of claim 13, wherein the one or more discriminating features include a mean pitch stability value, a mean pitch stability range, and a jitter value.

15. The non-transitory computer-readable storage medium of claim 13, wherein the classifying step includes:

prompting a user to speak a predetermined utterance, the predetermined utterance having one or more words that are discriminatory in distinguishing a human speech signal comprising a sequence of human vocal sounds from a synthetic speech signal configured to imitate the sequence of human vocal sounds;

storing a table of unique words and corresponding distance measures for human word models and synthetic word models in memory;

measuring a weighted distance between a human word utterance and a corresponding synthetic word utterance; and classifying the received speech as synthetic rather than human based on the measured distance as compared to the distance measures stored in the table.

* * * * *

UNITED STATES PATENT AND TRADEMARK OFFICE
CERTIFICATE OF CORRECTION

PATENT NO. : 9,865,253 B1
APPLICATION NO. : 14/465595
DATED : January 9, 2018
INVENTOR(S) : Steve Spence et al.

Page 1 of 1

It is certified that error appears in the above-identified patent and that said Letters Patent is hereby corrected as shown below:

In the Claims

Column 14, Line 28, Claim 5, delete "claim 3," and insert -- claim 1, --.

Column 14, Line 46, Claim 7, after "device:" delete "\".

Signed and Sealed this
Fifth Day of February, 2019

Andrei Iancu
*Director of the United States Patent and Trademark Office*